Figure 1:
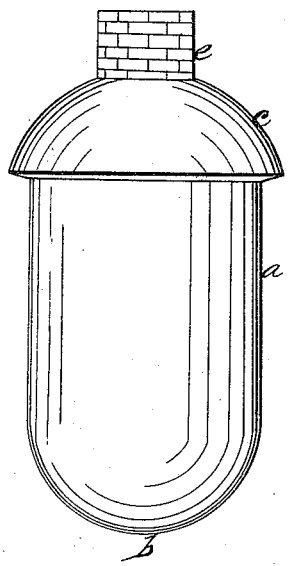
Figure 2:
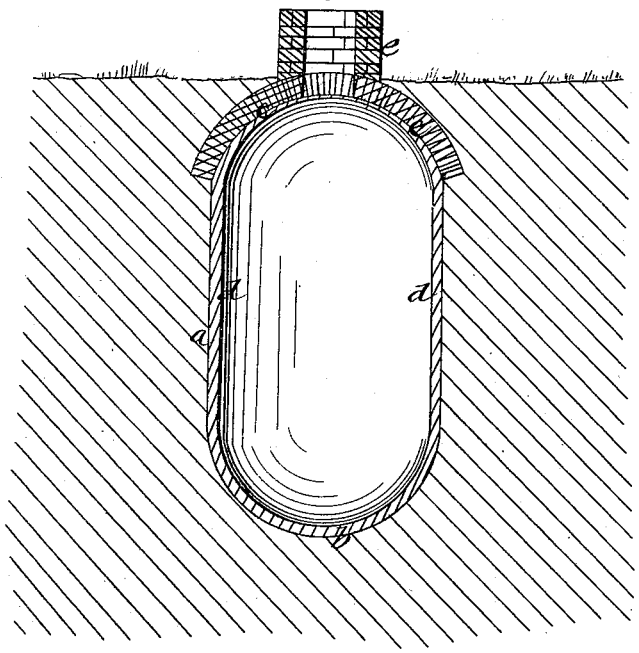

G. O. Blenis.

Constructing Cisterns.

Nº 357.                    Patented Aug. 18, 1837.

UNITED STATES PATENT OFFICE.

GEO. O'BLENIS, OF SALINA, NEW YORK.

CONSTRUCTION OF RAIN-WATER CISTERNS.

Specification of Letters Patent No. 357, dated August 18, 1837.

*To all whom it may concern:*

Be it known that I, GEORGE O'BLENIS, of the town of Salina, Onondaga county, and State of New York, have invented a new and useful improvement in the construction of "rain-water cisterns" built of Roman or American cement intermixed with sand in such proportions as the earth where said cistern is to be built may require, and that the following is a description of the mode of constructing said cisterns as invented and constructed by me.

Excavate a circular hole *a* in the earth the diameter and depth required to contain the requisite quantity of water, sloping the sides one inch to the foot more or less as the earth and time of season may require. The bottom *b*, must be formed concave from one to three feet in depth from the chord to the center of the inverted arch, varying in proportion to the size of the cistern to give sufficient strength to resist the pressure upward on the bottom lands where the earth becomes saturated or filled with water on the rising of streams and when said cistern is empty at such time. Where a cistern is built in dry land sufficient concavity only is necessary that the water may run to the center so that it may be nearly all drawn out without the settlings and thereby much easier cleaned out. The excavation being completed place a sufficient number of props or bearers within the same, with the necessary cross pieces, and covering to sustain a quantitiy of earth which is shaped convex for the centering. This convexity commences from six to twelve inches below the surface as the earth may require to sustain the top. That part of the side of said cistern which is above the base of the convex top must be taken off to an angle of from thirty to forty five degrees. This being done proceed to spread the cement on the angle embedding the first layer of brick therein. Now find the center of the cistern and strike a circle the size which may be desired for the neck. Then set up a layer of brick on said line making use of cement mortar and lay the required courses of brick. Then commence on the outer circle upon the centering until the space between the two circles is completely filled. Then lay three or four courses of brick in mortar around the neck to prevent the earth from falling in while plastering the same. A grouting is then made of cement and sand, and the top completely grouted so that all the apertures that may be between the bricks are filled and the ends of the bricks are completely covered. Now take out through the neck the earth or centering on which the top has been formed, likewise the scaffolding used to support the earth or centering. There should be from six to twelve inches of earth put on the top of the arch *c* to prevent injury while in a green state. This being done mix the cement with the sand in the proportion of one-fourth cement and three-fourths sand, then add the water and mix the same well. This proportion I have found to answer the purpose very well, except in wet land, where a greater proportion of cement is necessary for the first coat. The cement mortar being thus made, the different coats (with the exception of the last) must be put on with a float that will leave a rough surface so that the several coats will unite and form a solid body. The cement lining *d* should not be less than two inches in thickness for a cistern to contain 100 barrels and as the size is increased so must be the thickness of the cement wall. The required thickness being obtained with the exception of the last coat, which is to be put on with a trowel, this being done mix cement in a pail of water until it is the thickness of whitewash then with a trowel and brush rub it down as in case of a hard finish until all the pores are filled and a smooth surface is obtained which will make it perfectly impervious to water. The sides and bottom are to be finished in the same manner. The neck *e* must now be raised by adding courses of brick to the desired height; then plaster inside and outside and the outside to be floated using the brush as before described which will prevent contraction in the open air. The cistern is now complete and ready to receive water.

Among the advantages arising from my discoveries is one of introducing the Roman and American cement with success in the Southern States and on the river bottom lands where the water line cannot be used in consequence of the great length of time required for petrefaction to take place in case the Mississippi or its tributaries rise before petrefaction takes place it is wholly destroyed. I say this from experience, whereas the Roman or American cement sets and obtains a sufficient hardness to resist the pressure from without in a few days. Likewise the slope of the sides, the concave bottom, the manner of constructing the top, and the application of the cement with a wooden float, which is a preventive against scaling off are highly important improvements in the construction of rain water cisterns for the southern country along the sides of rivers.

The invention claimed by the subscriber and desired to be secured by Letters Patent consists in—

The before described method of constructing rain water cisterns with the bottom so formed as to constitute an inverted dome for the purpose of resisting the upward pressure of water in wet lands.

GEORGE O'BLENIS.

Witnesses:
S. MUTCHISON,
HARRISON DOGAL.